United States Patent
Komatsu

(10) Patent No.: US 11,245,474 B2
(45) Date of Patent: *Feb. 8, 2022

(54) PLUGGABLE OPTICAL MODULE AND OPTICAL COMMUNICATION SYSTEM

(71) Applicant: NEC Corporation, Tokyo (JP)

(72) Inventor: Hirokazu Komatsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/742,370

(22) Filed: Jan. 14, 2020

(65) Prior Publication Data
US 2020/0177283 A1    Jun. 4, 2020

Related U.S. Application Data

(63) Continuation of application No. 15/764,033, filed as application No. PCT/JP2016/003010 on Jun. 22, 2016, now Pat. No. 10,574,360.

(30) Foreign Application Priority Data

Sep. 30, 2015 (JP) .................................. 2015-193342

(51) Int. Cl.
*H04B 10/516* (2013.01)
*G02B 6/42* (2006.01)
(Continued)

(52) U.S. Cl.
CPC ......... *H04B 10/548* (2013.01); *G02B 6/4284* (2013.01); *G02B 6/4292* (2013.01);
(Continued)

(58) Field of Classification Search
CPC ............................ G02B 6/4284; G02B 6/4292
See application file for complete search history.

(56) References Cited

U.S. PATENT DOCUMENTS 9,071,364 B1    6/2015  Voois et al.
2009/0016685 A1*  1/2009  Hudgins ............... H04B 10/40
                                                                    385/92
(Continued)

FOREIGN PATENT DOCUMENTS

CN        102164006 A      8/2011
CN        102510310 A      6/2012
(Continued)

OTHER PUBLICATIONS

International Search Report dated Aug. 16, 2016, in corresponding PCT International Application.
(Continued)

*Primary Examiner* — Nathan M Cors

(57) ABSTRACT

An object is to output an optical signal accurately corresponding to a data signal. A pluggable optical module (100) includes a pluggable electric connector (11), a control unit (12), an optical signal output unit (13), and a pluggable optical receptor (14). The pluggable electric connector (11) can communicate a modulation signal (MOD) and a control signal (CON1) with an optical communication apparatus (92). The optical signal output unit (13) outputs an optical signal (LS) modulated by the modulation scheme by the control signal (CON1) in response to the modulation signal (MOD). The pluggable optical receptor (14) is configured in such a manner that an optical fiber (91) is insertable into and removable from the pluggable optical receptor (14). The pluggable optical receptor (14) can output the optical signal (LS) output from the optical signal output unit (13). The control unit (12) controls the optical signal output unit (13) to output the optical signal (LS) of a modulation amplitude set corresponding to the modulation signal (MOD) in the modulation scheme specified by the control signal (CON1).

14 Claims, 11 Drawing Sheets

(51) Int. Cl.
  *H04B 10/548* (2013.01)
  *H04B 10/50* (2013.01)
  *H04B 10/079* (2013.01)
  *H04B 10/564* (2013.01)
  *G02F 1/21* (2006.01)
  *G02F 1/225* (2006.01)

(52) U.S. Cl.
  CPC . *H04B 10/07955* (2013.01); *H04B 10/50593* (2013.01); *H04B 10/50595* (2013.01); *H04B 10/516* (2013.01); *H04B 10/564* (2013.01); *G02F 1/212* (2021.01); *G02F 1/225* (2013.01)

(56) References Cited

U.S. PATENT DOCUMENTS

2011/0293266 A1    12/2011  Aoki

2011/0299858 A1*   12/2011  Mazzini ............... H04B 10/516
                                                       398/183

FOREIGN PATENT DOCUMENTS

| EP | 0911997 A2 * | 3/1998 | ........... H04B 10/155 |
|----|--------------|--------|-------------------------|
| JP | 2004-126024  | 4/2004 |                         |
| JP | 2005-269100  | 9/2005 |                         |
| JP | 2007-053614  | 3/2007 |                         |
| JP | 2011-232553  | 11/2011 |                        |
| JP | 2011-250291  | 12/2011 |                        |
| JP | 2013-090292  | 5/2013 |                         |
| JP | 2015-119437  | 6/2015 |                         |

OTHER PUBLICATIONS

Office Action dated Jul. 3, 2020, issued by the Chinese Patent Office in counterpart Chinese Patent Application No. 201680057855.5.

* cited by examiner

PLUGGABLE OPTICAL MODULE AND OPTICAL COMMUNICATION SYSTEM

CROSS-REFERENCE TO RELATED PATENT APPLICATIONS

This application is a continuation of U.S. patent application Ser. No. 15/764,033, filed on Mar. 28, 2018, which is a National Stage Entry of International Application No. PCT/JP2016/003010, filed Jun. 22, 2016, which claims priority from Japanese Patent Application No. 2015-193342, filed Sep. 30, 2015. The entire contents of the above-referenced applications are expressly incorporated herein by reference.

TECHNICAL FIELD

The present invention relates to a pluggable optical module and an optical communication system.

BACKGROUND ART

In an optical communication system, an optical module used for transmitting and receiving an optical signal is mounted. Such optical module transmits and receives the optical signals of various wavelengths that are modulated by using various modulation schemes (e.g. QPSK [Quadrature Phase Shift Keying], 16QAM [Quadrature Amplitude Modulation], or another scheme) and multiplexed by using various schemes. Some examples of such optical modules have been already proposed.

For example, an optical communication apparatus for eliminating wavelength dependency of the optical signal has been proposed (Patent Literature 1). The optical communication apparatus controls output amplitude of a drive signal provided to an optical modulator so as to realize specified characteristics of the optical modulator according to a wavelength of the optical signal.

Meanwhile, implementing a pluggable optical module in the optical communication system that conforms to a standard such as SFP (Small Form-factor Pluggable) and XFP (10-gigabit small Form-factor Pluggable) is progressing. The pluggable optical module is a transceiver that is insertable into and removable from a socket of the optical communication apparatus (e.g. Patent Literatures 2 and 3). When the pluggable optical module is controlled, the pluggable optical module receives control information from the host side optical communication apparatus. An operation of the pluggable optical module is switched or changed in response to the received information.

CITATION LIST

Patent Literature

[Patent Literature 1] Japanese Unexamined Patent Application Publication No. 2004-126024
[Patent Literature 2] Japanese Unexamined Patent Application Publication No. 2005-269100
[Patent Literature 3] Japanese Unexamined Patent Application Publication No. 2007-53614

SUMMARY OF INVENTION

Technical Problem

The pluggable optical module is inserted into the external optical communication apparatus, serving as the host, and is required to have a function for modulating the optical signal by using the various modulation schemes according to communication specifications of the optical communication apparatus. For performing a modulation operation, the pluggable optical module receives a data signal that is an electric signal output from the optical communication apparatus and detects a peak voltage of the electric signal. A Mach-Zehnder type optical modulator mounted in the optical module has a drive voltage Vx for extinguishing an optical modulation output. It is desirable to stably provide appropriate voltage amplitude with respect the drive voltage Vx as voltage amplitude of the data signal. The voltage amplitude of the data signal can be stable by using a peak detection function disposed in the former stage of the optical modulator. A waveform of the electric signal also changes as the modulation scheme is changed. As a result, even when the peak voltage is the same, a voltage value detected in the optical modulator may vary depending on the modulation scheme. Thus, when using the peak detection function, a value not corresponding to the voltage that the peak should originally indicates may be detected depending on the modulation scheme. As a result, the modulation operation of the optical signal may not be accurately performed.

The present invention has been made in view of the aforementioned circumstances and aims to output an optical signal accurately corresponding to a data signal regardless of a modulation scheme when using a pluggable optical module.

Solution to Problem

An aspect of the present Invention is a pluggable optical module including: a pluggable optical connector configured to be insertable into and removable from an optical communication apparatus, and to be capable of communicating a first data signal and a control signal with the optical communication apparatus; an optical signal output unit configured to output a first optical signal modulated by using a modulation scheme specified by the control signal in response to the first data signal; a first pluggable optical receptor configured in such a manner that a first optical transmission line Is insertable into and removable from the first pluggable optical receptor, and configured to be capable of outputting the first optical signal, which is output from the optical signal output unit, to the first optical transmission line; and a control unit configured to control the optical signal output unit to output the first optical signal of modulation amplitude set in response to the first data signal under the modulation scheme specified by the control signal.

An aspect of the present invention is an optical communication system comprising: a first optical transmission line configured to transmit an optical signal; a pluggable optical module configured in such a manner that the first optical transmission line is insertable into and removable from the pluggable optical module, and to output the optical signal to the first optical transmission line; and an optical communication apparatus configured in such a manner that the pluggable optical module is insertable into and removable from the optical communication apparatus, in which the pluggable optical module includes: a pluggable optical connector configured to be insertable into and removable from the optical communication apparatus, and configured to be capable of communicating a first data signal and a control signal with the optical communication apparatus; an optical signal output unit configured to output a first optical signal modulated by using a modulation scheme specified by the control signal in response to the first data signal; a first pluggable optical receptor configured in such a manner that the first optical transmission line is insertable into and removable from the first pluggable optical receptor, and configured to be capable of outputting the first optical signal, which is output from the optical signal output unit, to the first optical transmission line; and a control unit configured to control the optical signal output unit to output the first optical signal of modulation amplitude set in response to the first data signal under the modulation scheme specified by the control signal.

Advantageous Effects of Invention

According to the present invention, in a pluggable optical module, it is possible to output an optical signal accurately corresponding to a data signal regardless of a modulation scheme.

DESCRIPTION OF EMBODIMENTS

Figure 1:
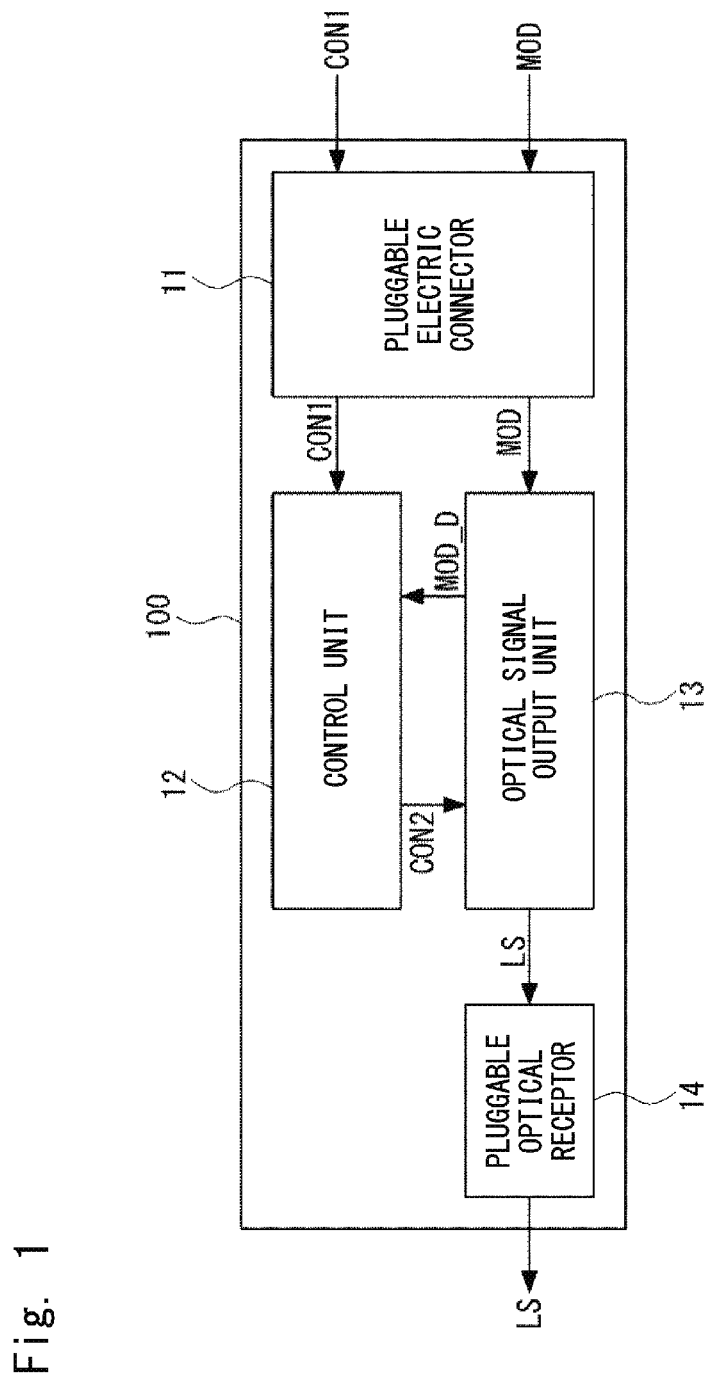
FIG. 1 is a block diagram schematically illustrating a configuration of a pluggable optical module according to a first exemplary embodiment.

Exemplary embodiments of the present invention will be described below with reference to the drawings. The same components are denoted by the same reference numerals throughout the drawings, and a repeated explanation is omitted as needed.

First Exemplary Embodiment

Figure 2:
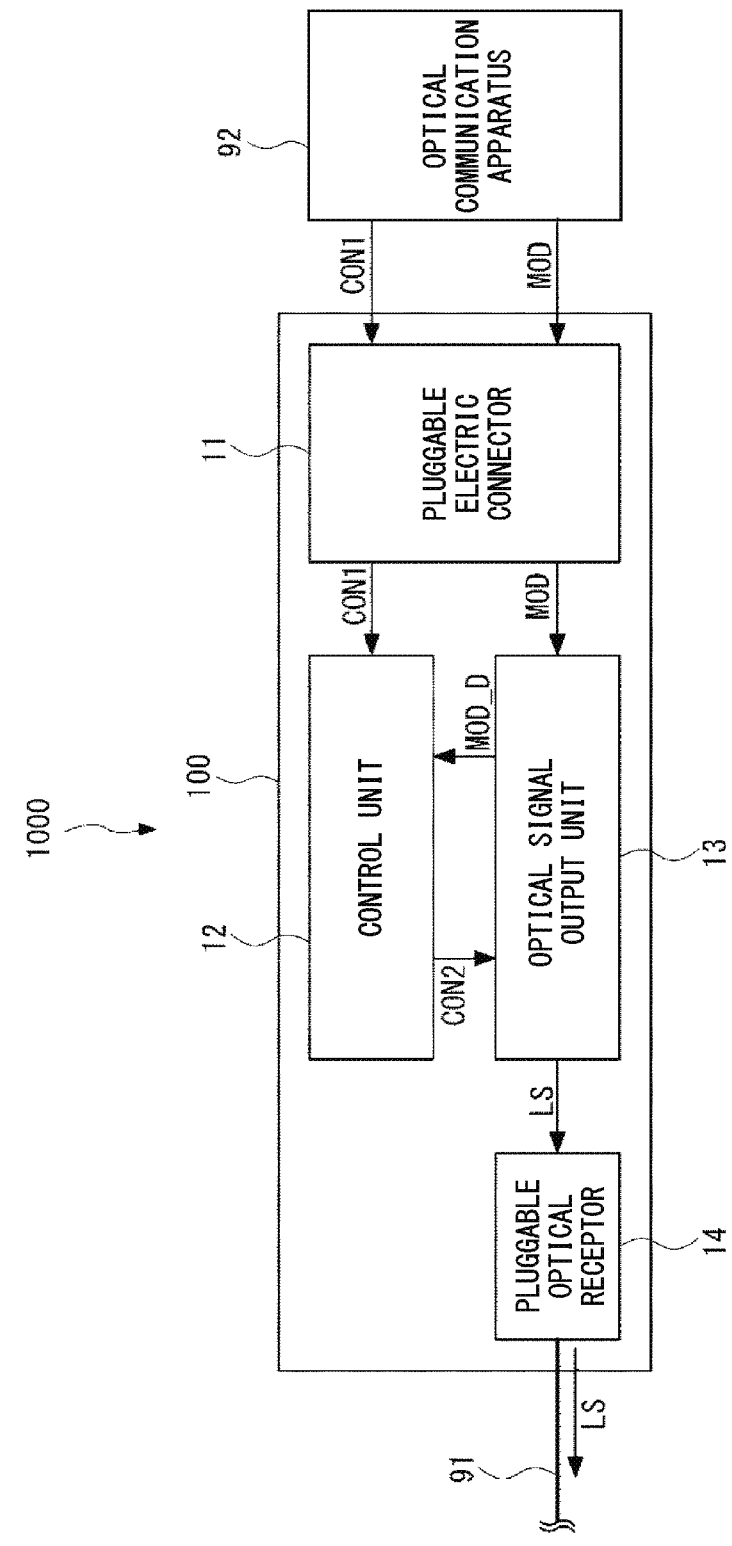
FIG. 2 is a block diagram illustrating a configuration example of a main part of an optical communication system in which the pluggable optical module according to the first exemplary embodiment is mounted.

A pluggable optical module 100 according to a first exemplary embodiment will be described. FIG. 1 is a block diagram schematically illustrating a configuration of the pluggable optical module 100 according to the first exemplary embodiment. FIG. 2 is a block diagram illustrating a configuration example of a main part of an optical communication system 1000 in which the pluggable optical module 100 according to the first exemplary embodiment is mounted. As illustrated in FIG. 2, the pluggable optical module 100 is configured in such a manner that a connector of an optical fiber with connector 91 (also referred to as a first optical transmission line) is insertable into and removable from the pluggable optical module 100. An LC connector and MU connector can be used as the connector of the optical fiber with connector 91. The pluggable optical module 100 is controlled based on a control signal CON1 input from an optical communication apparatus 92 that is a communication host. The pluggable optical module 100 can receive a modulation signal MOD (also referred to as a first data signal) serving as a data signal from the optical communication apparatus 92 with the control signal CON1 and output an optical signal LS (also referred to as a first optical signal) modulated based on the modulation signal MOD. For example, the optical communication apparatus 92 performs communication signal processing such as flaming processing of a communication data signal from the pluggable optical module 100 or a communication data signal input to the pluggable optical module 100.

The pluggable optical module 100 includes a pluggable electric connector 11, a control unit 12, an optical signal output unit 13, and a pluggable optical receptor 14 (also referred to as a first pluggable optical receptor).

The pluggable electric connector 11 is configured to be insertable into and removable from the optical communication apparatus 92. The pluggable electric connector 11 receives the control signal CON1, which is an electric signal output from the optical communication apparatus 92, and transfers the control signal CON1 to the control unit 12. The pluggable electric connector 11 also receives the modulation signal MOD, which is an electric signal output from the optical communication apparatus 92, and transfers the modulation signal MOD to the optical signal output unit 13. The pluggable electric connector 11 may also transfer an electric signal output from the control unit 12 to the optical communication apparatus 92.

The optical signal output unit 13 includes a Mach-Zehnder type optical modulator and outputs the optical signal LS modulated by using a predetermined modulation scheme. The optical signal output unit 13 modulates the optical signal LS by inputting a signal converted from the modulation signal MOD to a phase modulation area formed on an optical waveguide of the Mach-Zehnder type optical modulator. The optical signal output unit 13 can also control a bias point of the Mach-Zehnder type optical modulator by applying a bias voltage to the phase modulation area. The optical signal output unit 13 can modulate the optical signal LS by using various modulation schemes such as phase modulation, amplitude modulation and polarization modulation, or by combining the various modulation schemes.

The Mach-Zehnder type optical modulator is, for example, a semiconductor optical modulator or another optical modulator.

Here, the phase modulation area is an area that includes an electrode formed on the optical waveguide. An effective refractive index of the optical waveguide below the electrode is changed by applying an electric signal, for example, a voltage signal, to the electrode. As a result, a substantial optical length of the optical waveguide in the phase modulation area can be changed. Thus, the phase modulation area can change a phase of the optical signal propagating through the optical waveguide. Then, the optical signal can be modulated by providing a phase difference between the optical signals propagating through two optical waveguides.

Figure 3:
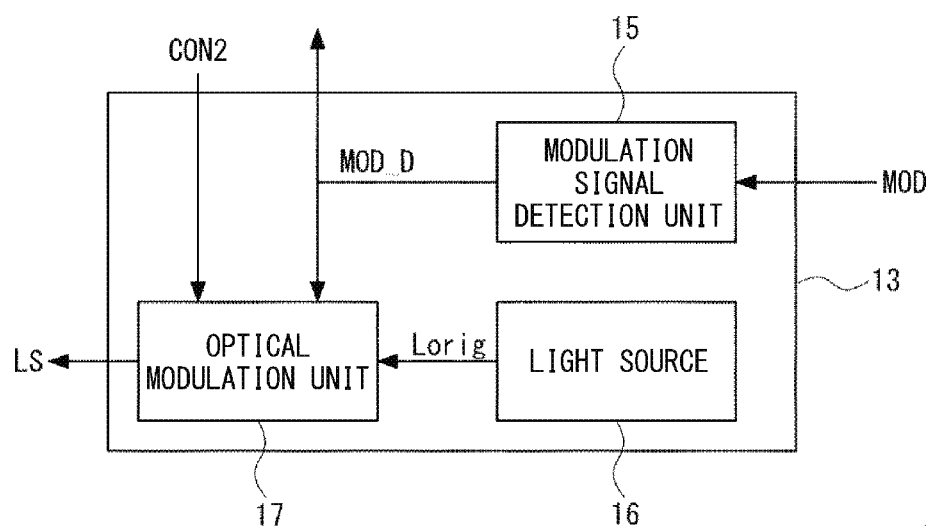
FIG. 3 is a block diagram illustrating a configuration example of an optical signal output unit according to the first exemplary embodiment.

A configuration example of the optical signal output unit 13 will be described. FIG. 3 is a block diagram illustrating a configuration example of the optical signal output unit 13 according to the first exemplary embodiment. The optical signal output unit 13 includes a modulation signal detection unit 15, a light source 16, and an optical modulation unit 17.

The modulation signal detection unit 15 has a peak detection function for detecting a peak voltage of the modulation signal MOD and outputs a modulation signal MOD_D that is the detection result to the control unit 12 and the optical modulation unit 17.

The light source 16 is, for example, a wavelength-tunable optical module or another component that includes a semiconductor laser device and a ring oscillator. The light source 16 outputs an output light Lorig. Although not illustrated, the light source 16 may be controlled by the control unit 12.

Figure 4:
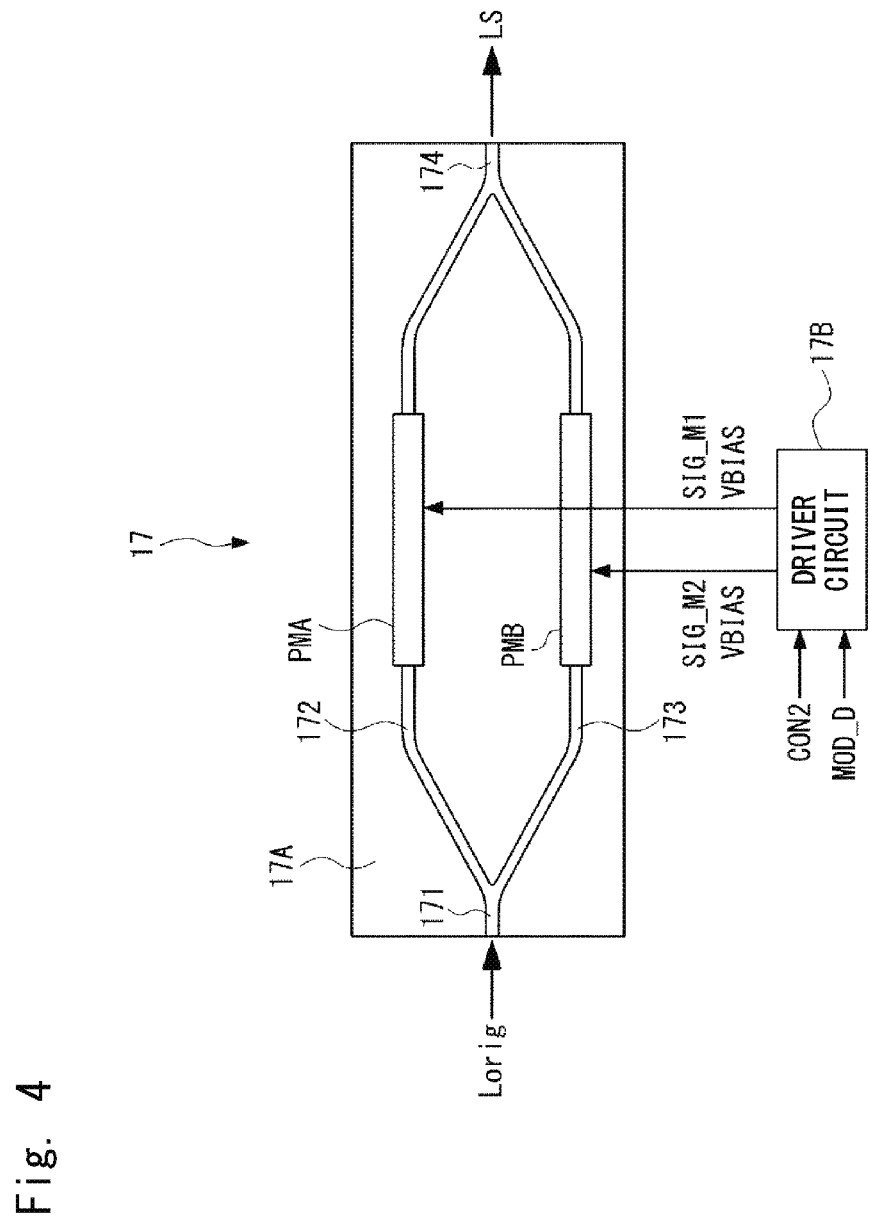
FIG. 4 schematically illustrates a configuration of an optical modulation unit according to the first exemplary embodiment.

The optical modulation unit 17 is, for example, the Mach-Zehnder type optical modulator. Note that, although not illustrated in FIG. 1, the optical modulation unit 17 outputs the optical signal LS generated by modulating the output light Lorig in response to the modulation signal MOD_D. FIG. 4 schematically illustrates a configuration of the optical modulation unit 17 according to the first exemplary embodiment. The optical modulation unit 17 is configured as a general Mach-Zehnder type optical modulator. The optical modulation unit 17 includes an optical modulator 17A and a driver circuit 17B.

The optical modulator 17A modulates the output light Lorig output from the light source 16 and outputs the optical signal LS. The optical modulator 17A includes optical waveguides 171 to 174, and phase modulation areas PMA and PMB. The output light Lorig output from the light source 16 is input to one end of the optical waveguide 171. The other and of the optical waveguide 171 is optically connected with one end of the optical waveguide 172 and one end of the optical waveguide 173. Thus, a light propagating through the optical waveguide 171 is branched toward the optical waveguide 172 and the optical waveguide 173. The other end of the optical waveguide 172 and the other end of the optical waveguide 173 are connected with one end of the optical waveguide 174. On the optical waveguide 172, the phase modulation area PMA that changes a phase of a light propagating through the optical waveguide 172 is disposed. On the optical waveguide 173, the phase modulation area PMB that changes a phase of a light propagating through the optical waveguide 172 is disposed. The light signal LS is output from the other end of the optical waveguide 174.

The driver circuit 17B can control a modulation operation of the optical modulator 17A. The driver circuit 17B can also control a bias point of the optical modulator 17A by applying a bias voltage VBIAS to one or both of the phase modulation areas PMA and PMB in response to a control signal CON2.

Hereinafter, it is assumed that the driver circuit 17B applies the bias voltage to the phase modulation areas PMA. The driver circuit 17B can also modulate the optical signal LS by applying the modulation signal MOD to one or both of the phase modulation areas PMA and PMB. In this example, the driver circuit 17B applies a modulation signal SIG_M1 to the phase modulation area PMA in response to the modulation signal MOD_D. The driver circuit 17B applies a modulation signal SIG_M2 to the phase modulation area PMB in response to the modulation signal MOD_D.

Figure 5:
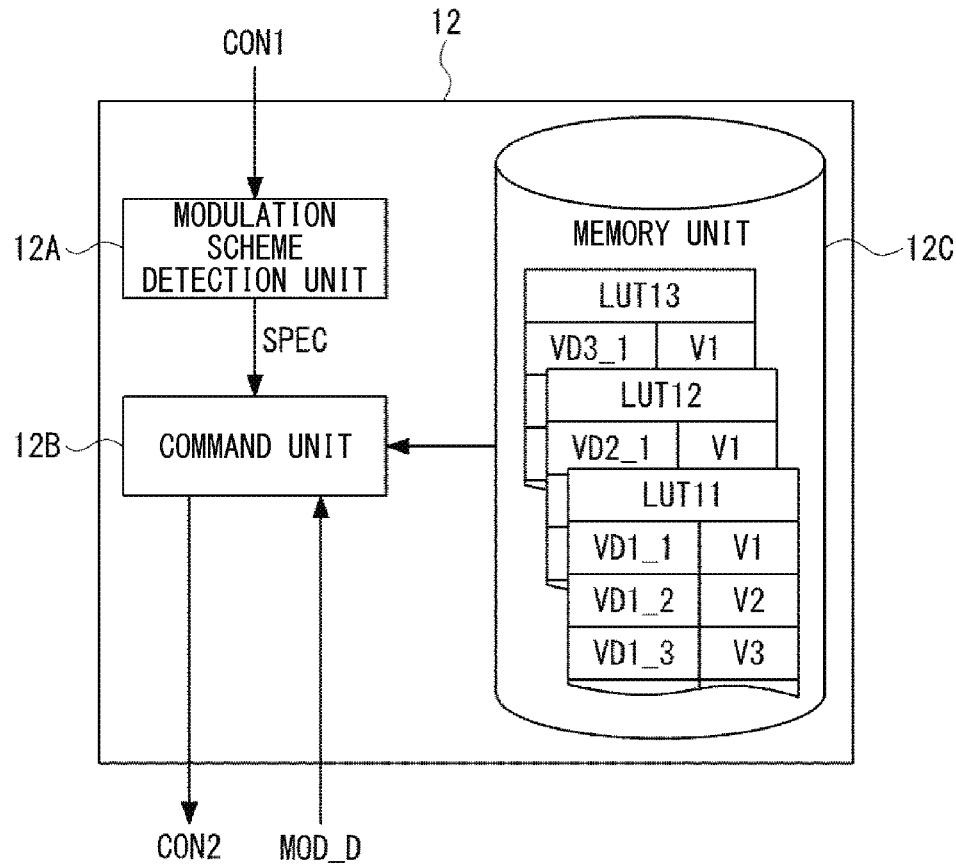
FIG. 5 is a block diagram Illustrating a configuration of a control unit according to the first exemplary embodiment.

The control unit 12 controls an operation of the optical signal output unit 13 based on the control signal CON1 input from the optical communication apparatus 92 through the pluggable electric connector 11. In the present exemplary embodiment, the control signal CON1 includes information specifying a modulation scheme used when the optical signal output unit 13 modulates the optical signal. FIG. 5 is a block diagram illustrating a configuration of the control unit 12 according to the first exemplary embodiment. The control unit 12 includes a modulation scheme detection unit 12A, a command unit 12B, and a memory unit 12C.

From the information specifying the modulation scheme included in the control signal CON1, the modulation scheme detection unit 12A specifies the modulation scheme used when the optical signal output unit 13 modulates the optical signal. The modulation scheme detection unit 12A notifies the command unit 12B of the specified modulation scheme by using a signal SPEC. The command unit 12B reads a modulation setting corresponding to the specified modulation scheme from the memory unit 12C based on the signal SPEC. The command unit 12B controls the optical signal output unit 13 based on the read modulation setting.

For example, information specifying a setting value that an optical detection unit should originally detect in response to a peak voltage value of the modulation signal MOD is stored in the memory unit 12C as a look-up table for each modulation scheme in advance. In FIG. 5, look-up tables LUT11 to LUT13 corresponding to three types of modulation schemes MT1 to MT3 are stored. In the look-up table LUT11, values VD1_1 to VD1_k are stored. The values VD1_1 to VD1_k are values that should be detected in response to peak voltages V1 to Vk (k is an integer) of the modulation signal MOD when the modulation scheme MT1 is used. In the look-up table LUT12, values VD2_1 to VD2_k are stored. The values VD2_1 to VD2_k are values that should be detected in response to the peak voltages V1 to Vk of the modulation signal MOD when the modulation scheme MT2 is used. In the look-up table LUT13, values VD3_1 to VD3_k are stored. The values VD3_1 to VD3_k are values that should be detected in response to the peak voltages V1 to Vk of the modulation signal MOD when the modulation scheme MT3 is used are stored.

Figure 6:
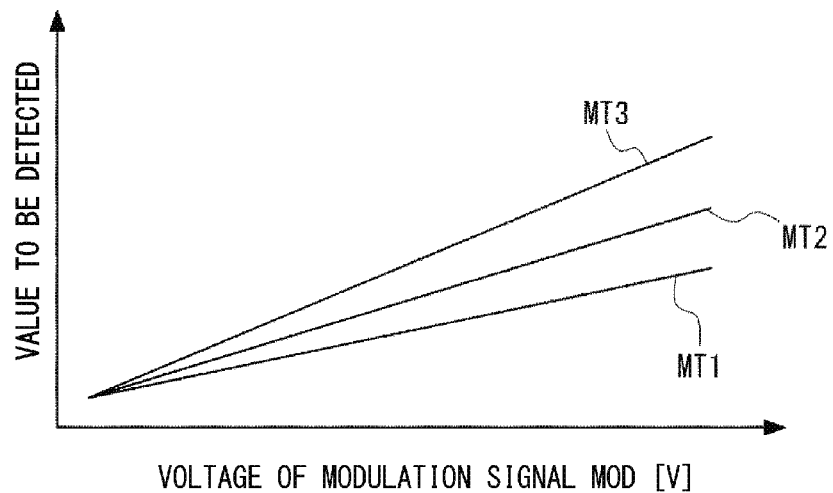
FIG. 6 schematically illustrates correlations between a voltage value of a modulation signal and a setting value to be detected in response to the voltage value.

Correlations (also referred to as first correlations) between the peak voltage value of the modulation signal MOD and the setting value to be detected in response to the peak voltage value represented by the look-up tables LUT11 to LUT13 are different. FIG. 6 schematically illustrates the correlations between the peak voltage value of the modulation signal MOD and the setting value to be detected in response to the peak voltage value. As illustrated in FIG. 6, the correlations represented by the modulation schemes MT1 to MT3 may be different.

The pluggable optical receptor 14 is configured in such a manner that the connector of the external optical fiber with connector 91 (also referred to as the first optical transmission line) is insertable into and removable from the pluggable optical receptor 14. The pluggable optical receptor 14 outputs the optical signal LS, which is output from the optical signal output unit 13, to the optical fiber 91.

Figure 7:
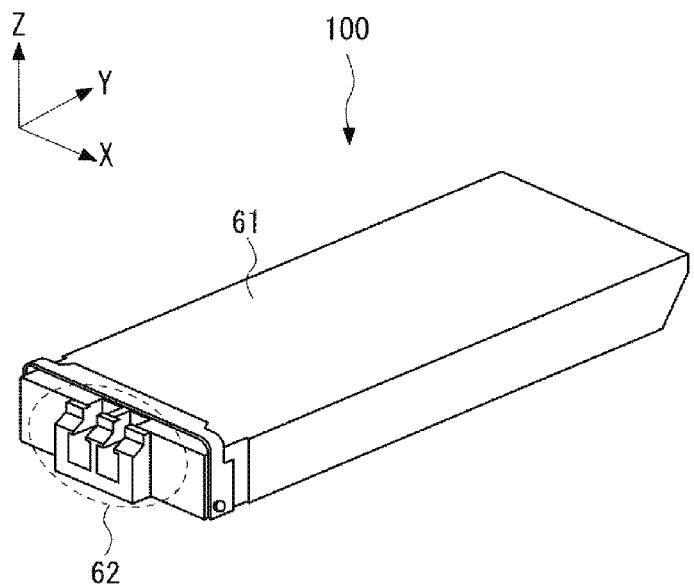
FIG. 7 is a perspective view of the pluggable optical module according to the first exemplary embodiment when observed from a side of an optical fiber.
Figure 8:
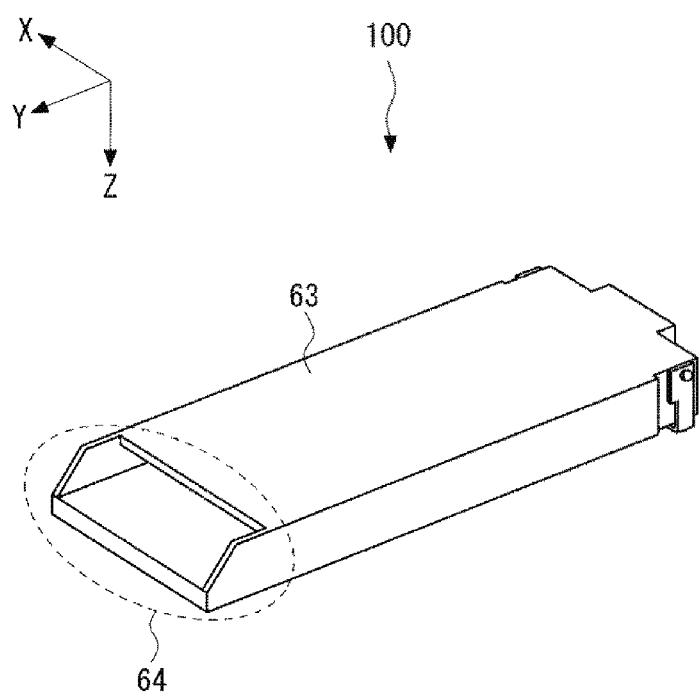
FIG. 8 is a perspective view of the pluggable optical module according to the first exemplary embodiment when observed from a side of an optical communication apparatus.

Next, an appearance of the pluggable optical module 100 will be described. FIG. 7 is a perspective view of the pluggable optical module 100 according to the first exemplary embodiment when observed from a side of the optical fiber 91. A numerical sign 61 shown in FIG. 7 indicates an upper surface of the pluggable optical module 100. A numerical sign 62 shown in FIG. 7 indicates an insertion port of the pluggable optical receptor 14 into which the connector of the optical fiber 91 enters. FIG. 8 is a perspective view of the pluggable optical module 100 according to the first exemplary embodiment when observed from a side of the optical communication apparatus 92. A numerical sign 63 shown in FIG. 8 indicates a lower surface of the pluggable optical module 100. A numerical sign 64 shown in FIG. 8 indicates a connection part of the pluggable electric connector 11 to which the optical communication apparatus 92 is connected.

Figure 9:
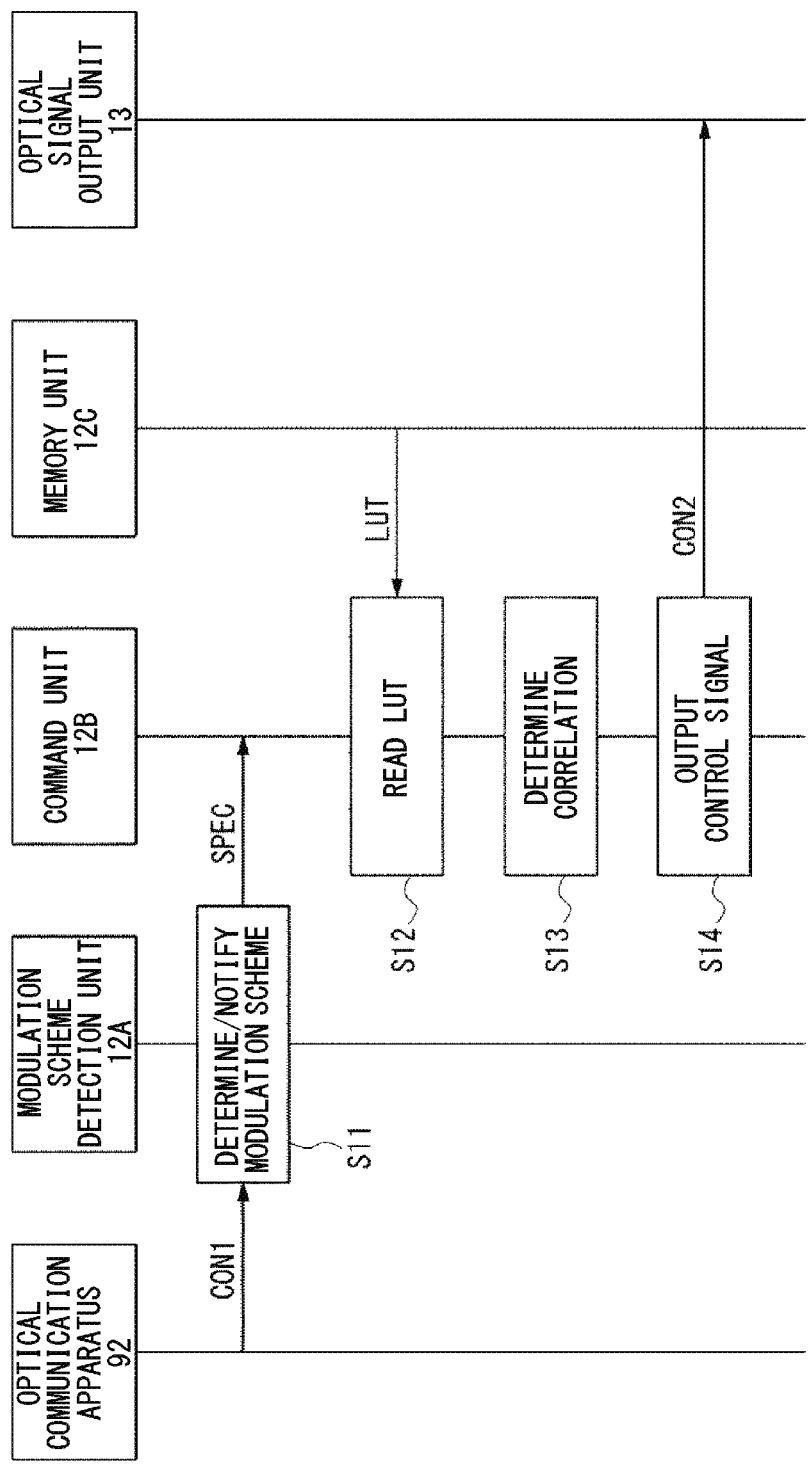
FIG. 9 is a sequence diagram illustrating an operation of the pluggable optical module according to the first exemplary embodiment.

An operation of the pluggable optical module 100 will be described below. FIG. 9 is a sequence diagram illustrating the operation of the pluggable optical module 100 according to the first exemplary embodiment.

Step S11

The modulation scheme detection unit 12A of the control unit 12 specifies the modulation scheme used when the optical signal output unit 13 modulates the optical signal LS from the information specifying the modulation scheme, which is included in the control signal CON1. Then, the modulation scheme detection unit 12A notifies the command unit 12B of the specified modulation scheme by using the signal SPEC.

Step S12

The command unit 12B reads the modulation setting corresponding to the specified modulation scheme from the memory unit 12C based on the signal SPEC.

Step S13

The command unit 12B reads one of the look-up tables LUT11 to LUT13. Thus, the command unit 12B determines the setting value that the optical signal output unit 13 should detect in response to the peak voltage of the modulation signal MOD under the specified modulation scheme. In other words, the command unit 12B determines the correlation between the peak voltage of the modulation signal MOD and the value to be detected by the optical signal output unit 13.

Step S14

The command unit 12B of the control unit 12 controls the optical signal output unit 13 by using the control signal CON2 in such a manner that the optical signal output unit 13 can realize the optical signal LS of the modulation amplitude that accurately reflects the modulation signal MOD according to the determined correlation. Specifically, even when the modulation signal MOD_D deviates from the setting value to be originally detected by the optical signal output unit 13 and a resulting difference causes, the command unit 12B can cancel the difference, for example, by controlling the bias voltage VBIAS provided to the optical modulation unit 17 of the optical signal output unit 13.

As described above, according to the pluggable optical module 100, it can be understood that it is possible to realize the optical signal of the desirable amplitude corresponding to the modulation signal MOD for each modulation scheme specified by the optical communication apparatus 92.

The modulation signal MOD_D, which indicates the result of detecting the peak voltage of the modulation signal MOD, is also input to the command unit 12B from the modulation signal detection unit 15. Thus, the command unit 12B can perform feed-back control of the bias voltage provided to the optical modulation unit 17 and the amplitude of the modulation signal (a drive signal) by referring to the modulation signal MOD_D. This makes it possible to realize the optical signal of the desirable amplitude. Therefore, it is possible to further improve quality of the optical signal under the specified modulation scheme.

When the modulation signal MOD_D deviates from the setting value to be originally detected by the optical signal output unit 13 and the resulting difference causes as described above, the difference may be detected by comparing the modulation signal MOD_D to the look-up table.

The look-up table described above is provided to the pluggable optical module 100 in advance, for example, according to specifications of the optical communication apparatus, which the optical module 100 is inserted into and removable from. For example, the modulation signal MOD and power of the optical signal LS corresponding to the modulation signal MOD may be measured at a shipping inspection of the pluggable optical module 100, and the look-up table may be generated based on the measurement result and input to the pluggable optical module 100.

Second Exemplary Embodiment

Figure 10:
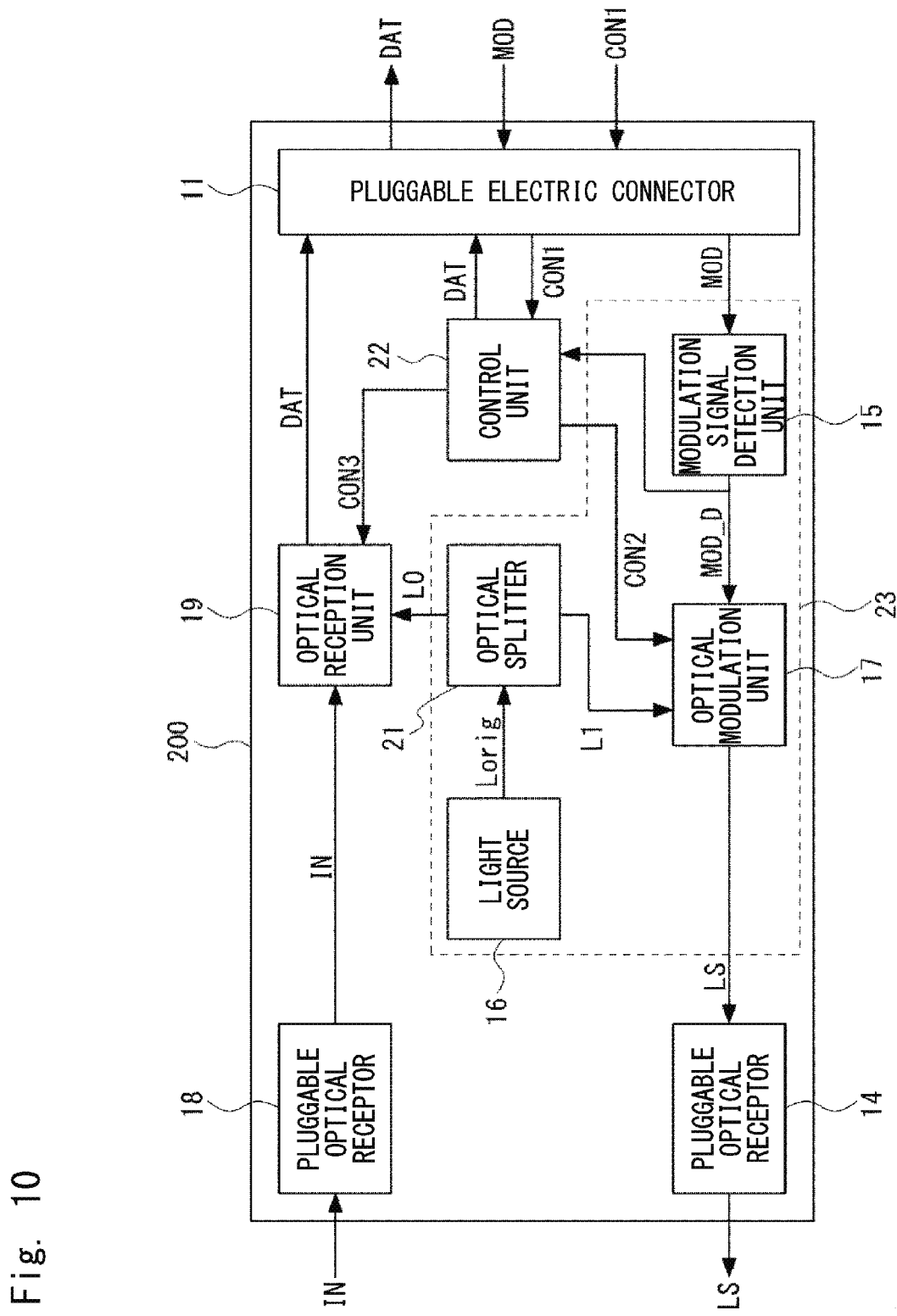
FIG. 10 is a block diagram schematically illustrating a configuration of a pluggable optical module according to a second exemplary embodiment.

A pluggable optical module 200 according to a second exemplary embodiment will be described. FIG. 10 is a block diagram schematically illustrating a configuration of the pluggable optical module 200 according to the second exemplary embodiment. The pluggable optical module 200 has the configuration in which a pluggable optical receptor 18 and an optical reception unit 19 are added to the pluggable optical module 100 according to the first exemplary embodiment and the optical signal output unit 13 and the control unit 12 of the pluggable optical module 100 are respectively replaced with a optical signal output unit 23 and a control unit 22. In the pluggable optical module 200, the optical signal output unit 23 and the pluggable optical receptor 14 constitute a transmitting side, and the pluggable optical receptor 18 and the optical reception unit 19 constitute a receiving side.

The optical signal output unit 23 includes the modulation signal detection unit 15, the light source 16, the optical modulation unit 17, and an optical splitter 21. Since the modulation signal detection unit 15, the light source 16 and the optical modulation unit 17 are the same as those of the pluggable optical module 100 according to the first exemplary embodiment, descriptions of those will be omitted. The optical splitter 21 splits the output light Lorig output from the light source 16. Thus, it is possible to output lights to both of the transmitting side (a light L1) and the receiving side (a local oscillation light LO). The optical modulation unit 17 modulates the light L1 output from the optical splitter 21 (e.g. phase modulation, amplitude modulation) into the optical signal LS. Note that splitting the output light Lorig is not limited to that by the optical splitter 21 and other optical splitting means can be used as appropriate.

The pluggable optical receptor 18 (also referred to as a second pluggable optical receptor) is a receiving side pluggable optical receptor. The pluggable optical receptor 18 is configured in such a manner that a connector of an optical fiber with connector for reception (also referred to as a second optical transmission line) is Insertable into and removable from the pluggable optical receptor 18. A FC connector and MU connector can be used as the connector of the optical fiber with connector. An optical signal IN (also referred to as a second optical signal) is input to the pluggable optical receptor 18 from a source host through the optical fiber.

The optical reception unit 19 is configured as a digital coherent optical receiver, for example. The optical reception unit 19 converts the optical signal IN received from the outside through the pluggable optical receptor 18 into a data signal DAT (also referred to a second data signal) that is an electric signal, and outputsthe data signal DAT to the optical transmission apparatus through the pluggable electric connector 11. The optical reception unit 19 is configured to be capable of demodulating the optical signal IN modulated by using the various modulation schemes.

Figure 11:
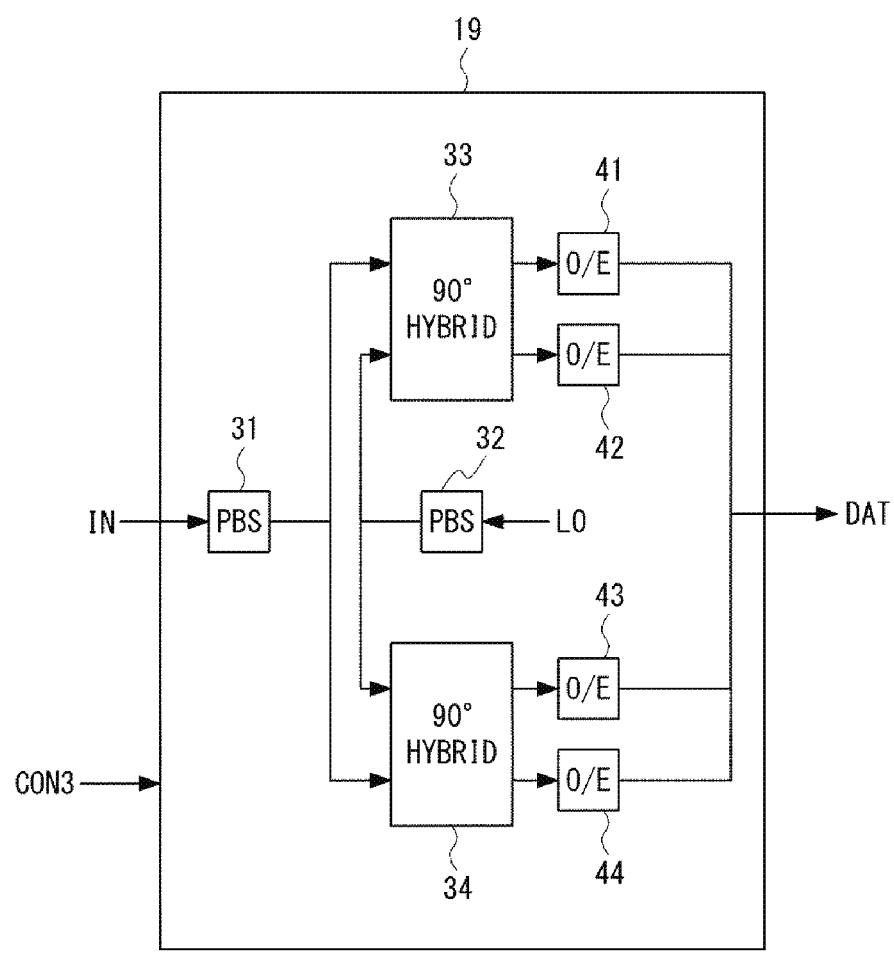
FIG. 11 is a block diagram illustrating a configuration example of an optical reception unit according to the second exemplary embodiment.

The optical reception unit 19 is, for example, a reception unit performing digital coherent reception for demodulating a DP-QPSK (Dual-Polarization Quadrature Phase-Shift Keying) optical signal into the electric signal. FIG. 11 is a block diagram illustrating a configuration example of the optical reception unit 19 according to the second exemplary embodiment. As illustrated in FIG. 11, the optical reception unit 19 includes a polarization beam splitter (referred to as a PBS hereinafter) 31, a PBS32, 90-degree hybrids 33 and 34, optical/electrical converters (referred to as O/Es hereinafter) 41 to 44, analog to digital converters (referred to as ADCs hereinafter) 51 to 54, a digital signal processor (referred to as a DSP hereinafter) 35.

The DP-QPSK optical signal is input to the PBS 31 through the pluggable optical receptor 18. The PBS 31 splits the input DP-QPSK optical signal into two polarized components orthogonal to each other. Specifically, the PBS 31 splits the DP-QPSK optical signal into an x-polarized component $x_{in}$ and a y-polarized component $y_{in}$ orthogonal to each other. The x-polarized component $x_{in}$ is input to the 90-degree hybrid 33 and the y-polarized component $y_{in}$ is input to the 90-degree hybrid 34.

The light output from the optical splitter 21 is input to the PBS 32 as the local oscillation light. In the present exemplary embodiment, the local oscillation light is a CW (Continuous Wave) light of a predetermined frequency. The PBS 32 splits the local oscillation light into two polarized components orthogonal to each other (an x-polarized component $LO_x$ and a y-polarized component $LO_y$). The x-polarized component $LO_x$ of the local oscillation light is input to the 90-degree hybrid 33 and the y-polarized component $LO_y$ of the local oscillation light is input to the 90-degree hybrid 34.

The 90-degree hybrid 33 performs detection by causing the x-polarized component $LO_x$ of the local oscillation light and the x-polarized component $x_{in}$ to interfere with each other, and outputs an I (in-phase) component (referred to as an $x_{in}$-I component) and Q (quadrature-phase) component (referred to as an $x_{in}$-Q component) whose phase is different from that of the I component by 90 degrees as detected lights. The 90-degree hybrid 34 performs detection by causing the y-polarized component $LO_y$ of the local oscillation light and the y-polarized component $y_{in}$ to interfere with each other, and outputs an I component (referred to as a $y_{in}$-I component) and Q component (referred to as a $y_{in}$-Q component) as detected lights.

The optical/electrical converters 41 to 44 photoelectrically convert the four optical signals (the $x_{in}$-I component, the $x_{in}$-Q component, the $y_{in}$-I component and the $y_{in}$-Q component) output from the 90-degree hybrids 33 and 34, respectively. Then the optical/electrical converters 41 to 44 output analog electric signals (the data signal DAT) generated by the optical/electrical conversions to the external optical communication apparatus 92 through the pluggable electric connector 11, respectively. The data signal DAT is output to the external optical communication apparatus 92 through the pluggable electric connector 11.

Figure 12:
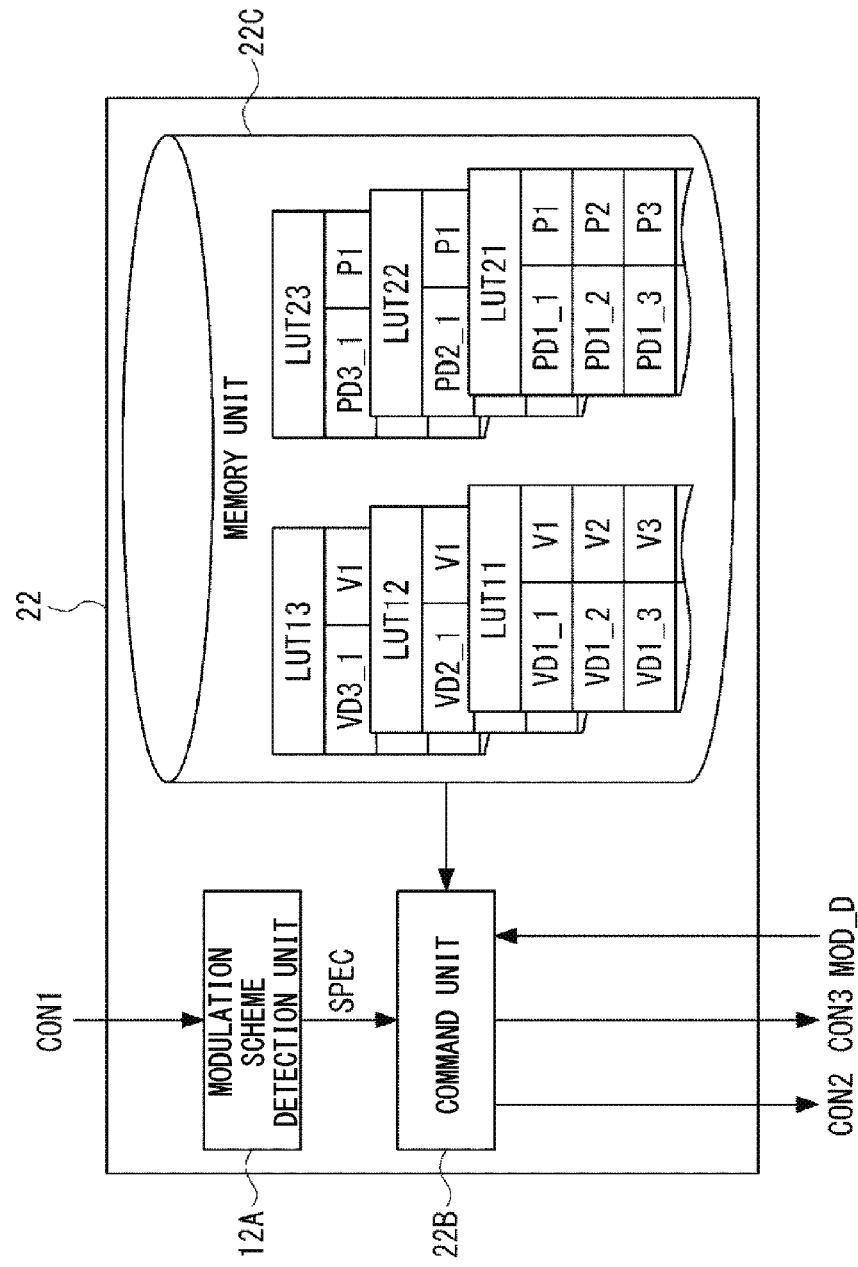
FIG. 12 is a block diagram illustrating a configuration of a control unit according to the second exemplary embodiment.

The control unit 22 is configured to control not only an operation of the optical signal output unit 23 but also an operation of the optical reception unit 19 based on the control signal CON1. FIG. 12 is a block diagram illustrating a configuration of the control unit 22 according to the second exemplary embodiment. The control unit 22 has a configuration in which the command unit 12B and the memory unit 12C of the control unit 12 according to the first exemplary embodiment are respectively replaced with a command unit 22B and a memory unit 22C. Since the modulation scheme detection unit 12A is the same as that of the control unit 12, a description of that will be omitted.

The command unit 22B reads the modulation setting corresponding to the specified modulation scheme from the memory unit 22C based on the signal SPEC. The command unit 22B controls the optical signal output unit 23 and the optical reception unit 19 based on the read modulation setting.

The look-up tables LUT11 to LUT13 corresponding to the three types of modulation schemes MT1 to MT3 are stored in the memory unit 22C. As described in the first exemplary embodiment, the look-up tables LUT11 to LUT13 are used for controlling the optical signal output unit 23. Look-up tables LUT21 to LUT23 that correspond to the three types of modulation schemes MT1 to MT3 used for controlling the optical reception unit 19 are further stored in the memory unit 22C. In the look-up table LUT21, peak amplitude voltage values PD1_1 to PD1_$k$ of the data signal DAT are stored. The peak amplitude voltage values PD1_1 to PD1_$k$ are the values that should be output from the optical reception unit 19 according to a received optical modulation scheme (QPSK, 8QAM, 16QAM, or the like) when the modulation scheme MT1 is used. In the look-up table LUT22, peak amplitude voltage values PD2_1 to PD2_$k$ of the data signal DAT are stored. The peak amplitude voltage values PD2_1 to PD2_$k$ are the values that should be output from the optical reception unit 19 when the modulation scheme MT2 is used. In the look-up table LUT23, peak amplitude voltage values PD3_1 to PD3_$k$ of the data signal DAT are stored. The peak amplitude voltage values PD3_1 to PD3_$k$ that should be output from the optical reception unit 19 when the modulation scheme MT3 is used. Correlations between intensity of the optical modulation scheme represented by the look-up tables LUT21 to LUT23 and the peak voltage value of the data signal DAT to be output from the optical reception unit 19 in response to those are different.

Figure 13:
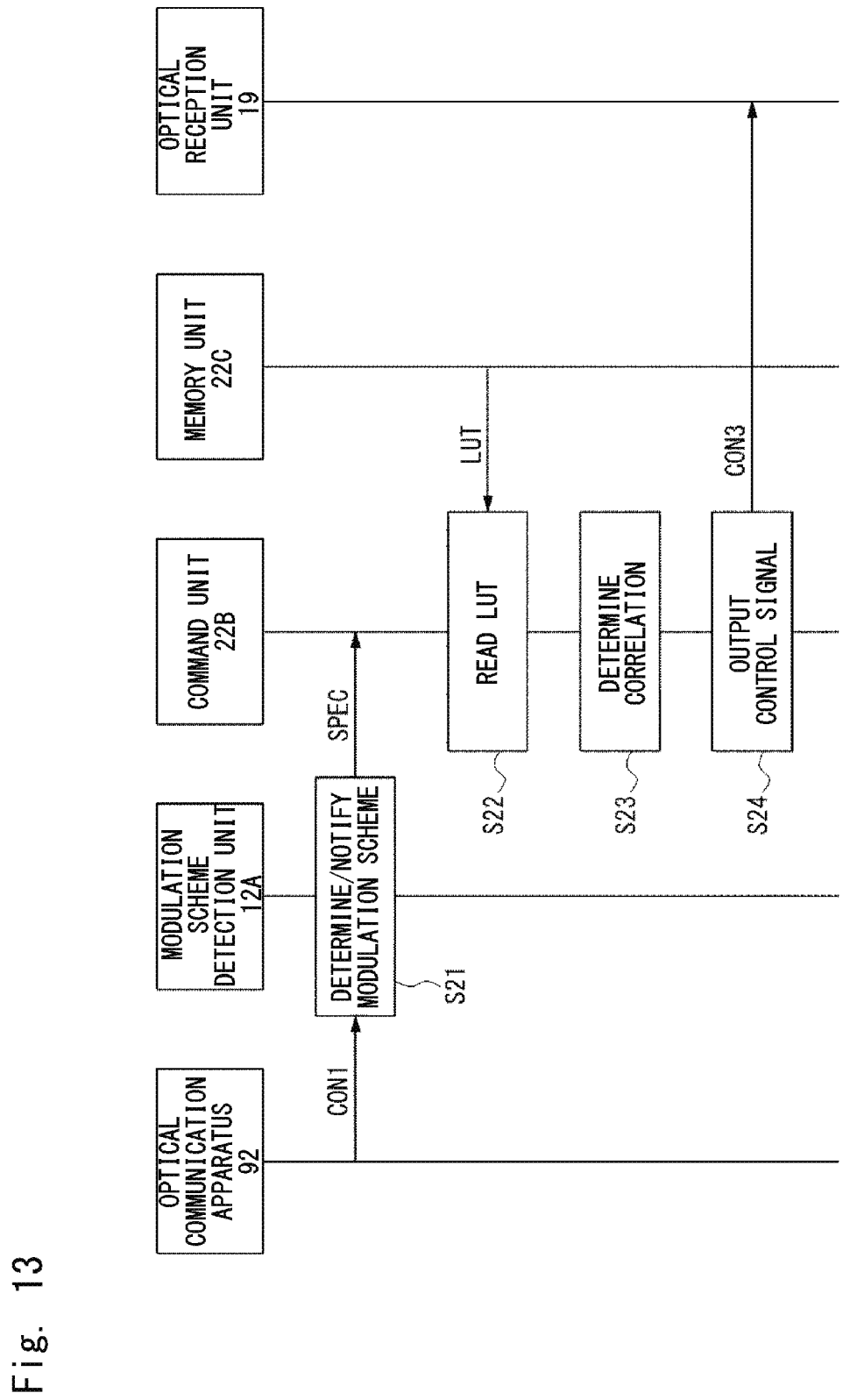
FIG. 13 is a sequence diagram illustrating an operation of a receiving side of the pluggable optical module according to the second exemplary embodiment.

Next, an operation of the pluggable optical module 200 will be described. Since an operation of the transmitting side is the same as that of the pluggable optical module 100 illustrated in FIG. 9, a description of that will be omitted. FIG. 13 is a sequence diagram illustrating an operation of the receiving side of the pluggable optical module 200 according to the second exemplary embodiment.

Step S21

The modulation scheme detection unit 12A of the control unit 22 specifies the modulation scheme used when the optical reception unit 19 demodulates the optical signal IN from the information specifying the modulation scheme included in the control signal CON1. Then, the modulation scheme detection unit 12A notifies the command unit 22B of the specified modulation scheme by using the signal SPEC. Accordingly, the operation of the step S21 is similar to that of the step S11 in FIG. 9.

Step S22

The command unit 22B reads the modulation setting corresponding to the specified modulation scheme from the memory unit 22C based on the signal SPEC.

The command unit 22B reads one of the look-up tables LUT21 to LUT23 so as to determine the correlation (also referred to as a second correlation) of the peak voltage value of the data signal DAT to be output from the modulation signal detection unit 15 of the optical reception unit 19 according to the specified modulation scheme.

Step S24

The command unit 22B controls a gain of a TIA (a transimpedance amplifier, for example, included in the optical/electrical converters 41 to 44) included in the optical reception unit 19 by using a control signal CON3 in such a manner that the optical reception unit 19 outputs stable voltage amplitude according to the determined correlation.

According to the present configuration, it is possible to realize demodulation adapted to the modulation scheme of the optical signal in the case of demodulating the received optical signal. Therefore, it is possible to prevent an error in signal demodulation and to obtain an excellent quality demodulation signal.

Additionally, the transmitting side and the receiving side share the light source 16 in the present configuration and thus it is also possible to realize miniaturization of the pluggable optical module 200 in which transmission and reception are integrated. It should be appreciated that each of the transmitting side and the receiving side may have an independent light source in the present exemplary embodiment.

Other Exemplary Embodiments

The present Invention is not limited to the above-described exemplary embodiments, and can be modified as appropriate without departing from the scope of the invention. For example, in the exemplary embodiment described above, although the example in which the three look-up tables used for controlling the optical signal output units 13 and 23 are disposed has been described, it is merely an example. The number of the look-up tables used for controlling the optical signal output units 13 and 23 may be two or any number equal to or more than four. In the exemplary embodiment described above, although the example in which the three look-up tables used for controlling the optical reception unit 19 are disposed has been described, it is merely an example. The number of the look-up tables used for controlling the optical reception unit 19 may be two or any number equal to or more than four.

In the exemplary embodiment described above, although it has been described that the control unit controls the optical signal output unit and the optical reception unit in response to the control signal CON1 output from the optical communication apparatus 92, it is merely an example. The control unit may control one or both of the optical signal output unit and the optical reception unit in response to a control signal output from other than the optical communication apparatus 92.

In the exemplary embodiment described above, although it has been described that the control unit controls the modulation amplitude of the optical signal by controlling the bias voltage provided to the phase modulations area of the optical modulation unit, controlling the modulation amplitude of the optical signal Is not limited to this method. For example, it should be appreciated that the output amplitude of the modulation signal detection unit may be adjusted in such a manner that the modulation signal detection unit can output the signal that has the amplitude corresponding to the peak detection voltage detected by the modulation signal detection unit. A gain of the optical modulation unit (i.e. the driver circuit of the optical modulation unit) may be adjusted to control the modulation amplitude of the optical signal.

In the exemplary embodiments described above, the communication of the control signal through the pluggable electric connector 11 can be achieved by applying technologies such as a MDIO (Management Data Input/Output) or an I2C (Inter-Integrated Circuit).

In the exemplary embodiments described above, the power of the optical signal output from the optical signal output unit may be monitored and, for example, feedback control of optical output power of the light source disposed in the optical signal output unit may be performed. In this case, a part of the light output from the optical signal output unit is split by an optical splitter or the like and the split light is monitored by a light receiving device such as a photo-diode. Thus, the control unit can perform the feedback control of the power of the optical signal output from the optical signal output unit by notifying the control unit of the monitoring result.

In the exemplary embodiments described above, when the modulation signal deviates from the setting value to be originally detected by the optical signal detection unit and the resulting difference is caused, the command unit controls the bias voltage provided to the optical modulation unit of the optical signal output unit to cancel the difference. However, it is merely an example. For example, the command unit may control the modulation signal detection unit to cause the value of the modulation signal MOD_D to be the same as an original setting value corresponding to the peak voltage value of the modulation signal MOD.

In the second exemplary embodiment, it is described that the pluggable optical receptor 14 and the pluggable optical receptor 18 are separately disposed. However, it should be appreciated that the pluggable optical receptor 14 and the pluggable optical receptor 18 may constitute an integrated pluggable optical receptor.

In the exemplary embodiments described above, the configurations of the control unit, the optical signal output unit, and the optical reception unit have been described. However, as long as the same functions and operations as the control unit, the optical signal output unit, and the optical reception unit in the above-described exemplary embodiments can be realized, other configurations may be adopted to each of the control unit, the optical signal output unit, and the optical reception unit.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2015-193342, filed on Sep. 30, 2015, the disclosure of which is incorporated herein in its entirety by reference.

REFERENCE SIGNS LIST

11 PLUGGABLE ELECTRIC CONNECTOR
12, 22 CONTROL UNITS
12A MODULATION SCHEME DETECTION UNIT
12B, 22B COMMAND UNITS
12C, 22C MEMORY UNITS

13 OPTICAL SIGNAL OUTPUT UNIT
14, 18 PLUGGABLE OPTICAL RECEPTORS
15 MODULATION SIGNAL DETECTION UNIT
16 LIGHT SOURCE
17 OPTICAL MODULATION UNIT
17A OPTICAL MODULATOR
17B DRIVER CIRCUIT
19 OPTICAL RECEPTION UNIT
21 OPTICAL SPLITTER
31, 32 POLARIZATION BEAM SPLITTERS (PBSS)
33, 34 90-DEGREE HYBRIDS
41 TO 44 OPTICAL/ELECTRICAL CONVERTERS
91 OPTICAL FIBER
92 OPTICAL COMMUNICATION APPARATUS
100, 200 PLUGGABLE OPTICAL MODULES
171 TO 174 OPTICAL WAVEGUIDES
1000 OPTICAL COMMUNICATION SYSTEM
CON1 TO CON3 CONTROL SIGNALS
LO LOCAL OSCILLATION LIGHT
Lorig OUTPUT LIGHT
LS OPTICAL SIGNAL
L1 LIGHT
MOD, MOD_D MODULATION SIGNALS
PMA, PMB PHASE MODULATION AREAS
LUT11 TO LUT13, LUT21 TO LUT23 LOOK-UP TABLES

The invention claimed is:

1. A pluggable optical module comprising:
a pluggable electric connector configured to connect with a host communication apparatus;
a first pluggable optical receptor configured to connect with a first optical fiber;
a modulator configured to output a first optical signal modulated based on a modulation signal from the host communication apparatus; and
a controller configured to change a bias voltage of the modulator in response to a change of a peak voltage of the modulation signal, the bias voltage being based on control information indicating a modulation scheme from the host communication apparatus, wherein the controller is further configured to:
identify a target value of a voltage of the modulation signal for each modulation scheme indicated by the control information, based on the peak voltage and the control information; and
control the modulator based on the identified target value.

2. The pluggable optical module according to claim 1, further comprising a light source configured to output a light, wherein
the modulator is further configured to comprise a Mach-Zehnder type optical modulator in which a phase modulation area is disposed on an optical waveguide, and
the Mach-Zehnder type optical modulator modulates the light and output the first optical signal.

3. The pluggable optical module according to claim 2, wherein the controller is further configured to control amplitude of the modulation signal or a bias voltage applied to the phase modulation area.

4. The pluggable optical module according to claim 1, wherein
the controller is further configured to
store the target value of a voltage of the modulation signal for each modulation scheme indicated by the control information.

5. The pluggable optical module according to claim 1, wherein
the modulator comprises a driver configured to generate the bias voltage in accordance with a control by the controller.

6. A pluggable optical module comprising:
a pluggable electric connector configured to connect with a host communication apparatus;
a first pluggable optical receptor configured to connect with a first optical fiber;
a modulator configured to output a first optical signal modulated based on a modulation signal from the host communication apparatus;
a controller configured to change a bias voltage of the modulator in response to a change of a peak voltage of the modulation signal, the bias voltage being based on control information indicating a modulation scheme from the host communication apparatus;
a second pluggable optical receptor configured to connect with a second optical fiber; and
an optical receiver configured to receive a second optical signal via the second pluggable optical receptor, and convert the received second optical signal into a data signal, wherein
the controller is further configured to control the optical receiver based on the control information.

7. The pluggable optical module according to claim 6, wherein the controller is further configured to:
store a target value of amplitude of the data signal for each modulation scheme indicated by the control information;
identify the target value based on the control information; and
control the optical receiver based on the identified target value.

8. An optical communication system comprising:
a first optical fiber configured to transmit an optical signal;
a pluggable optical module configured in such a manner that the first optical fiber is insertable into and removable from the pluggable optical module, and to output the optical signal to the first optical fiber; and
a host communication apparatus configured in such a manner that the pluggable optical module is insertable into and removable from the host communication apparatus, wherein
the pluggable optical module comprises:
a pluggable electric connector configured to connect with the host communication apparatus;
a first pluggable optical receptor configured to connect with the first optical fiber;
a modulator configured to output a first optical signal modulated based on a modulation signal from the host communication apparatus; and
a controller configured to change a bias voltage of the modulator in response to a change of a peak voltage of the modulation signal, the bias voltage being based on control information indicating a modulation scheme from the host communication apparatus, wherein the controller is further configured to:
identify a target value of a voltage of the modulation signal for each modulation scheme indicated by the control information, based on the peak voltage and the control information; and
control the modulator based on the identified target value.

9. The optical communication system according to claim 8, further comprising a light source configured to output a light, wherein the modulator is further configured to comprise a Mach-Zehnder type optical modulator in which a phase modulation area is disposed on an optical waveguide, and the Mach-Zehnder type optical modulator modulates the light and output the first optical signal.

10. The optical communication system according to claim 9, wherein the controller is further configured to control amplitude of the modulation signal or a bias voltage applied to the phase modulation area.

11. The optical communication system according to claim 8, wherein
the controller is further configured to
store the target value of a voltage of the modulation signal for each modulation scheme indicated by the control information.

12. The optical communication system according to claim 8, wherein
the modulator comprises a driver configured to generate the bias voltage in accordance with a control by the controller.

13. An optical communication system comprising:
a first optical fiber configured to transmit an optical signal;
a pluggable optical module configured in such a manner that the first optical fiber is insertable into and removable from the pluggable optical module, and to output the optical signal to the first optical fiber; and
a host communication apparatus configured in such a manner that the pluggable optical module is insertable into and removable from the host communication apparatus, wherein the pluggable optical module comprises:
a pluggable electric connector configured to connect with the host communication apparatus;
a first pluggable optical receptor configured to connect with the first optical fiber;
a modulator configured to output a first optical signal modulated based on a modulation signal from the host communication apparatus; and
a controller configured to change a bias voltage of the modulator in response to a change of a peak voltage of the modulation signal, the bias voltage being based on control information indicating a modulation scheme from the host communication apparatus;
a second pluggable optical receptor configured to connect with a second optical fiber; and
an optical receiver configured to receive a second optical signal via the second pluggable optical receptor, and convert the received second optical signal into a data signal, wherein
the controller is further configured to control the optical receiver based on the control information.

14. The optical communication system according to claim 13, wherein the controller is further configured to:
store a target value of amplitude of the data signal for each modulation scheme indicated by the control information;
identify the target value based on the control information; and
control the optical receiver based on the identified target value.

* * * * *